United States Patent

Andrä et al.

[11] Patent Number: 5,168,774
[45] Date of Patent: Dec. 8, 1992

[54] ROTATIONAL BODY

[75] Inventors: Rainer-Horst Andrä, Limburg; Günter Ullrich, Hemsbach, both of Fed. Rep. of Germany

[73] Assignee: Firma Carl Freudenberg, Weinheim/Bergstr, Fed. Rep. of Germany

[21] Appl. No.: 675,294

[22] Filed: Mar. 26, 1991

[30] Foreign Application Priority Data

Jun. 2, 1990 [DE] Fed. Rep. of Germany ....... 4017913

[51] Int. Cl.⁵ ............................................. F16F 15/12
[52] U.S. Cl. ........................................ 74/574; 464/89
[58] Field of Search .................... 464/89, 180; 74/574

[56] References Cited

U.S. PATENT DOCUMENTS

| 2,594,555 | 4/1952 | Hardy | 74/574 |
|---|---|---|---|
| 2,779,211 | 1/1957 | Henrich | 74/574 |
| 3,088,332 | 5/1963 | Arnt. Jr. | 74/574 |
| 3,901,101 | 8/1975 | McGavern | 74/574 |
| 4,178,811 | 12/1979 | Shepherd | 464/89 X |
| 4,223,565 | 9/1980 | Sugiyama et al. | 74/574 |
| 4,558,773 | 12/1985 | Schafer | 74/574 X |
| 4,825,983 | 5/1989 | Nakanishi | 74/574 X |
| 4,881,426 | 11/1989 | Serizawa et al. | 74/574 |
| 4,961,254 | 10/1990 | Andra et al. | 464/89 X |
| 4,962,677 | 10/1990 | Withers | 74/574 |

Primary Examiner—Leslie A. Braun
Assistant Examiner—Julie Krolikowski
Attorney, Agent, or Firm—Felfe & Lynch

[57] ABSTRACT

A rotational body is made of a deep-drawn sheet metal portion and has a hollow cylindrical center portion integral therewith which can be connected to a shaft. The sheet metal portion 1 and the center portion 2 are manufactured as one continuous piece. A metallic shrink-on sleeve 3 can immovably be affixed to the outer circumference of the center portion by shrink-fitting.

2 Claims, 1 Drawing Sheet

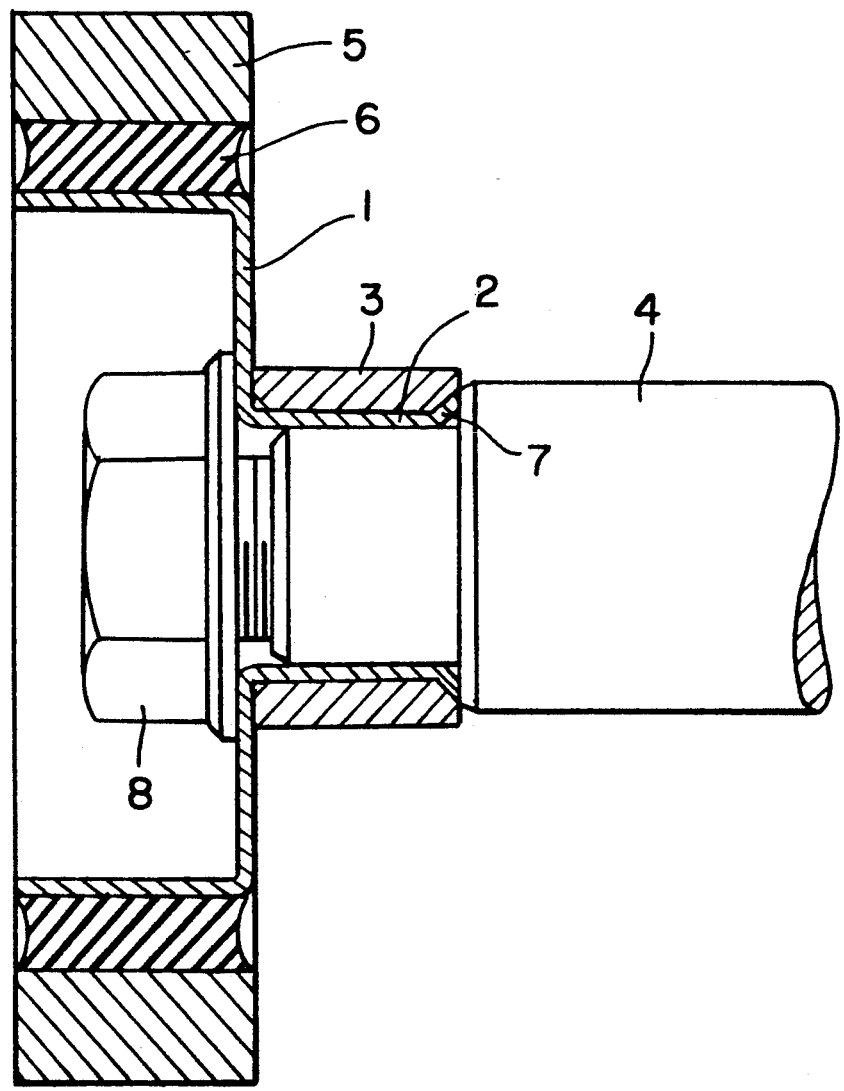

ROTATIONAL BODY

BACKGROUND OF THE INVENTION

The invention relates to a rotational body made of a piece of sheet metal and a hollow-cylindrical center part connected thereto and affixed to a shaft.

A rotational body of this general kind is known. The sheet metal portion and the center portion are joined via a welded or a threaded connection. In order to avoid a misalignment of the mutual arrangement or a relative displacement thereof in radial direction, special means must be provided for this purpose while the portions are joined together. Technically and economically, this is not very satisfactory.

The invention is directed to the object to further develop a rotational body of this kind such that the center portion and sheet metal portion are associated with one another in a connection where they are rotationally balanced and not misaligned while the manufacture is further simplified.

This object is accomplished in accordance with the invention with a rotational body of the aforesaid kind in that the sheet metal portion and the center portion join one another as one piece with the joining being provided by means of deep-drawing, and in that a metallic shrink-on sleeve is immovably affixed onto the outer circumference of the center portion in a shrunk-fit connection.

The shrink-on sleeve is produced independently of the sheet metal part, for example, by cutting a rod of a certain material on an automatic lathe into defined segments. It is rotationally balanced and dimensionally arranged such that any possible non-round features of the center portion which may follow the shrink-fitting of the sleeve can no longer be perceived. If the material for the shrink-on sleeve and the sheet metal part are related to each other, it is necessary to provide the shrink-on sleeve with a wall thickness which exceeds the one of the sheet metal part by at least two-fold, advantageously by at least three times the amount. In order to ensure an axial flush contact with the arm of the profile of the sheet metal portion extending in radial direction, the inside of the one end of the shrink-on sleeve which faces the sheet metal portion in axial direction should be rounded or chamfered. Any sharp-edged configuration of the transitional zone between the radially and axially extending arms of the profile of the sheet metal part can thus be disregarded. This is advantageous as far as a firm connection is concerned.

Due to the direct contact between the axial bounding surface of the shrink-on sleeve and the radially extending arm of the profile of the sheet metal part, it is possible to associate the arm with a clamping means in the form of a screw in an area axially opposed to the shrink-on sleeve. This ensures a particularly simple, non-moving association of the sheet metal part to the subsequent machine part, for example a rotating shaft. The latter is advantageously provided with a circumferential collar at which the support sleeve with its front surface that faces away from the sheet metal portion will rest when the screw is tightened.

This further favors a concentric, aligned association of sheet metal part to rotating machine part.

At the end axially facing away from the sheet metal portion, the center portion is provided with a projection. The latter engages a bevel in the shrink-on sleeve and extends the circumference of the center portion in radial direction in order to provide an additional security measure against any undesired separation between center portion and shrink-on sleeve. Advantageously, the projection is produced as a plastic formation of the axial end extending over the shrink-on sleeve following the shrink-fitting of the sleeve onto the center portion. Advantageously, it also has a rotationally balanced configuration.

The shrink-on sleeve is affixed to the rotational body of the invention in that either the inner diameter of the shrink-on sleeve is expanded prior to the fitting onto the center part by applying sufficient heat or the outer diameter of the center part is reduced by cooling it prior to the fitting to such an extent that the mounting is easily possible. Subsequently, the temperatures of both parts are equalized generating a mutual pressing contact in radial direction thus immovably affixing both parts to one another.

The shrink-on sleeve must be a form-stable material which has sufficient tensile strength. In a preferred manufacture, use is made of metallic material, steel, for example. It is then possible to combine the shrink-on sleeve with a secondary sealing means in accordance with the use of the object, for example a radial shaft sealing ring and make use thereof for secondary purposes.

The rotational body of the invention is distinguished in that it can be particularly well reproduced. Its manufacture is inexpensive and allows a high degree of precision which is advantageous for mass production.

The rotational body can be used in various areas of mechanical engineering. A preferred field of application includes the use as a center ring in torsional vibration dampers and the manufacture of pulleys for the particular use in automotive engineering. In both cases, it is an additional advantage that the strength, referred to the total weight, is at an optimum.

SUMMARY OF THE INVENTION

In accordance with the invention, a rotational body made from a deep-drawn sheet metal portion and a hollow cylindrical center portion integral therewith and mounted to a shaft comprises a sheet metal portion and a center portion manufactured as one continuous piece by means of deep-drawing, and a metallic shrunk-on sleeve immovably affixed to the circumference of the center portion by shrink-fitting.

For a better understanding of the invention, together with other and further objects thereof, reference is made to the following description, taken in connection with the accompanying drawings, and its scope will be pointed out in the appended claims.

BRIEF DESCRIPTION OF THE DRAWING

Referring now to the drawing, the FIG. is a sectional view of a rotational body in accordance with the invention.

DESCRIPTION OF THE PREFERRED EMBODIMENT

The drawing shows the rotational body used as a center ring of torsional vibration damper. It essentially comprises an inertia ring 5 which is affixed to the outer circumference of the center ring by means of a prevulcanized intermediate layer 6 of rubber. The center ring has a pot-like shape and, by means of deep-drawing, it is configured as one piece together with the center portion 2. A shrink-on ring 3 made of steel is immovably mounted to the circumference of the center portion 2 by means of shrink-fitting. In the course of manufacture, the outer diameter of the hollow cylindrical center portion 2 and the inner diameter of the shrink-on sleeve 3 are adjusted to one another such that after the shrink-fitting of shrink-on sleeve 3 to center portion 2, both parts are joined in an immovable connection.

At both axial ends, the profile of the shrink-on sleeve has a chamfering on the insides. Following the attachment onto the center portion 2, the sleeve rests with its one front surface directly onto the arm of the profile of the sheet metal portion which extends in radial direction. During use in accordance with the invention, it engages with its other front surface a radially protruding collar of the machine part to be connected which, in the present case, is formed by shaft 4. Inserting clamping screw 8 into the receiving bore of the machine part will provide an axial holding of the arm of the profile of sheet metal part 1 which protrudes in radial direction. This favors the firm mounting at the machine part and, in addition, the aligned, rotationally balanced association therewith.

At the end facing away from the sheet metal part 1, the center portion is provided with a rotationally balanced projection 7. The latter extends over the outer diameter of the center part in radial direction and engages the recess of the shrink-on sleeve.

This additionally secures the attachment between shrink-on sleeve 3 and sheet metal part 1. Moreover, the resulting hollow cylindrical end of the center portion facilitates mounting on the connecting piece of the shaft 4.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A rotational body made from a deep-drawn sheet metal portion and a hollow cylindrical center portion integral therewith and mounted to a shaft, comprising: a sheet metal portion and a hollow cylindrical portion having a circumference and both portions being manufactured as one continuous piece by deep-drawing, and a metal shrink-on sleeve immovably affixed to the circumference of the center portion by shrink-fitting, in which in the rotational body at an end facing away from the sheet metal portion in axial direction, the center portion has a projection which engages a bevel on the shrink-on sleeve and extends over an outer circumference thereof in radial direction.

2. A rotational body made from a deep-drawn sheet metal portion and a hollow cylindrical center portion integral therewith and mounted to a shaft, comprising: a sheet metal portion and a hollow cylindrical center portion having a circumference and both portions being manufactured as one continuous piece by deep-drawing, and a metallic shrink-on sleeve having a bevel and immovably affixed to the circumference of the center portion having a projection by shrink-fitting, in which the rotational body and the bevel and the projection are rotationally balanced.

* * * * *